United States Patent
Shipman

(10) Patent No.: US 12,397,838 B1
(45) Date of Patent: Aug. 26, 2025

(54) CART

(71) Applicant: Gregory Dean Shipman, Richland, WA (US)

(72) Inventor: Gregory Dean Shipman, Richland, WA (US)

(*) Notice: Subject to any disclaimer, the term of this patent is extended or adjusted under 35 U.S.C. 154(b) by 284 days.

(21) Appl. No.: 18/088,567

(22) Filed: Dec. 25, 2022

(51) Int. Cl.
  *B62B 3/10* (2006.01)
  *B62B 3/12* (2006.01)
  *B62B 5/00* (2006.01)

(52) U.S. Cl.
  CPC ............... *B62B 3/108* (2013.01); *B62B 3/12* (2013.01); *B62B 5/0083* (2013.01)

(58) Field of Classification Search
  CPC .......... B62B 3/12; B62B 3/108; B62B 5/0083
  See application file for complete search history.

(56) References Cited

U.S. PATENT DOCUMENTS

| | | | | |
|---|---|---|---|---|
| 3,731,947 | A * | 5/1973 | Fontaine | E06C 1/397 182/127 |
| 4,545,592 | A * | 10/1985 | Taskovic | A45C 13/385 280/35 |
| 8,662,486 | B2 * | 3/2014 | Holder | B25B 1/00 269/152 |
| 10,017,199 | B2 * | 7/2018 | Silva | B62B 3/02 |
| 10,696,315 | B2 * | 6/2020 | Monk | A01K 29/00 |

* cited by examiner

*Primary Examiner* — Bryan A Evans
(74) *Attorney, Agent, or Firm* — Plager Schack LLP; Mark H. Plager; Naomi Mann

(57) ABSTRACT

Disclosed is a cart comprising a retaining frame assembly configured to support and retain a door in a vertical position, the retaining frame assembly comprising a base support frame and side support members coupled to the base support frame. In certain embodiments, the cart may further comprise a wheel assembly including a front wheel and a rear wheel assembly, wherein the front wheel assembly comprises a single swivel wheel coupled to a bottom side of the retaining frame assembly, wherein the rear wheel assembly comprises a pair of wheels coupled to opposing outer sides of the retaining frame assembly, and wherein the wheels of the rear wheel assembly are larger than the wheel of the front wheel assembly.

12 Claims, 4 Drawing Sheets

CART

BACKGROUND

The present disclosure relates generally to carts for transport of planar items such as doors.

Transporting a planar item such as a door on a construction site and/or other areas, particularly where the terrain may be rough, can be challenging and inconvenient. As such, an improved transport system is desirable.

SUMMARY

According to various embodiments, disclosed is a cart comprising: a retaining frame assembly configured to support and retain a door in a vertical position, the retaining frame assembly comprising a base support frame and side support members coupled to the base support frame; a wheel assembly configured to rollably support the retaining frame assembly, the wheel assembly comprising a front wheel assembly coupled to a front section of the retaining frame assembly, and a rear wheel assembly coupled to a rear section of the retaining frame assembly, the rear wheel assembly and the front wheel assembly, wherein the front wheel assembly comprises a single swivel wheel coupled to a bottom side of the retaining frame assembly, wherein the rear wheel assembly comprises a pair of wheels coupled to opposing outer sides of the retaining frame assembly, and wherein the wheels of the rear wheel assembly are larger than the wheel of the front wheel assembly.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
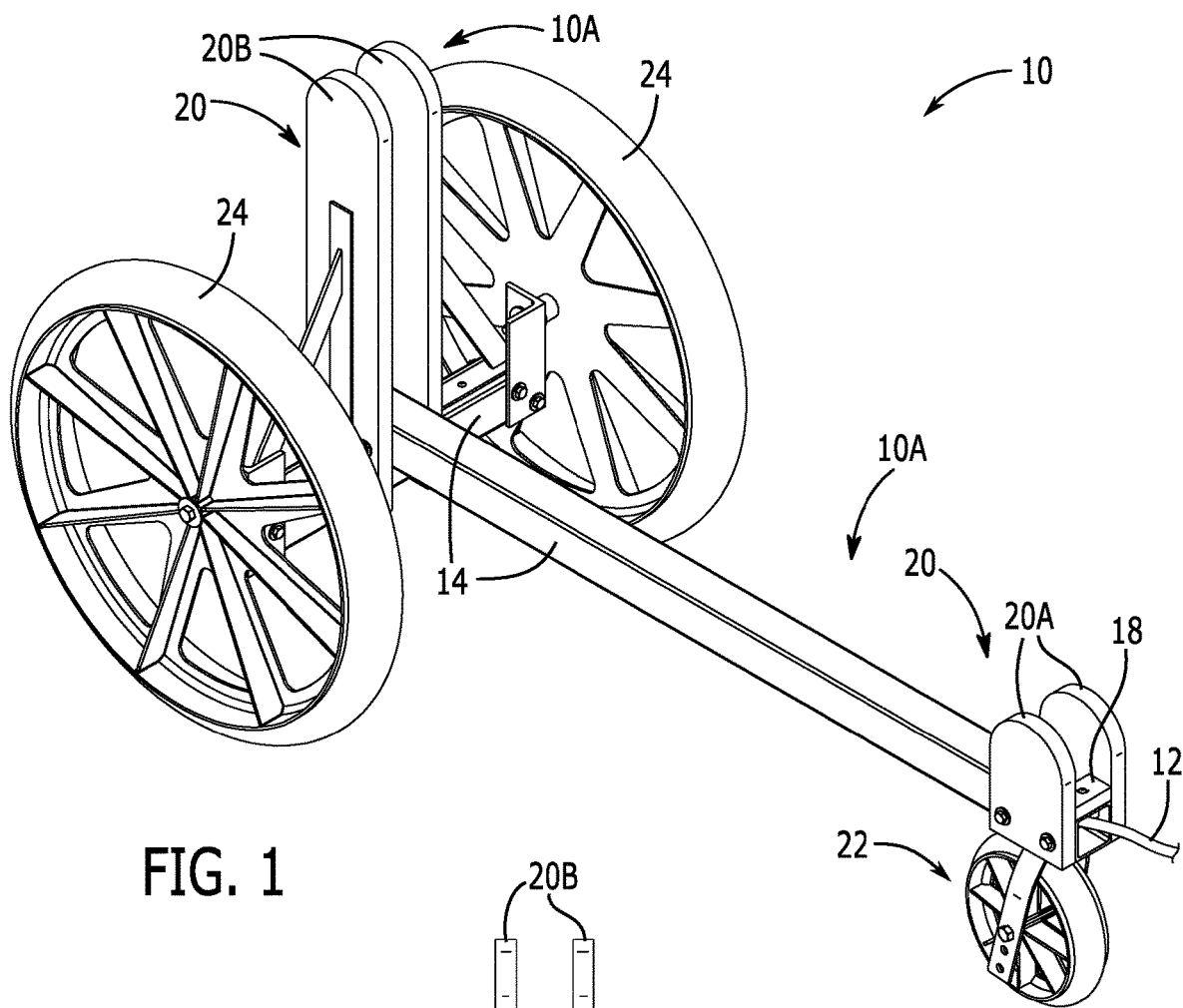
FIG. 1 is a side perspective view of a cart in accordance with various embodiments.
Figure 2:
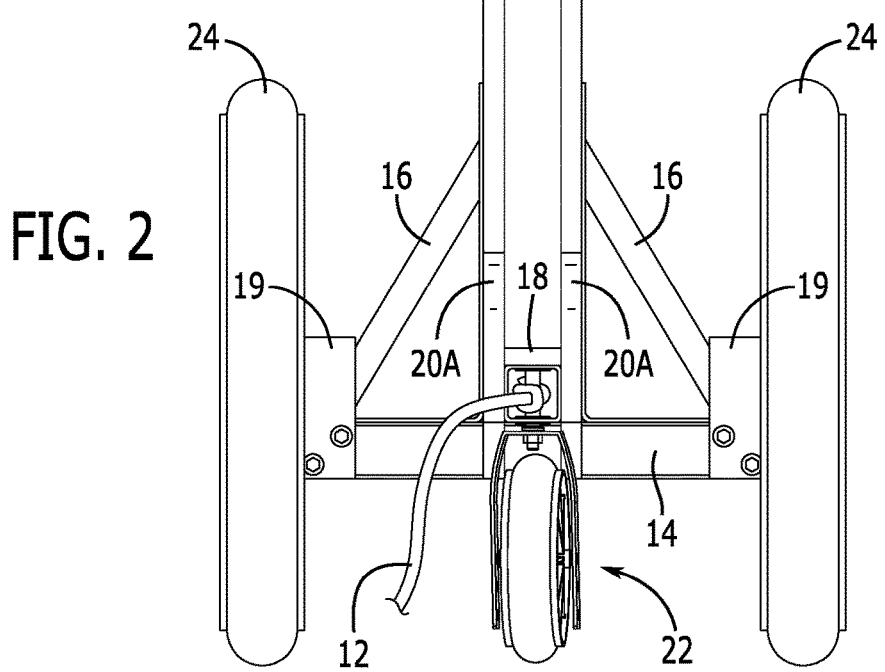
FIG. 2 is a front elevation view of the cart.
Figure 3:
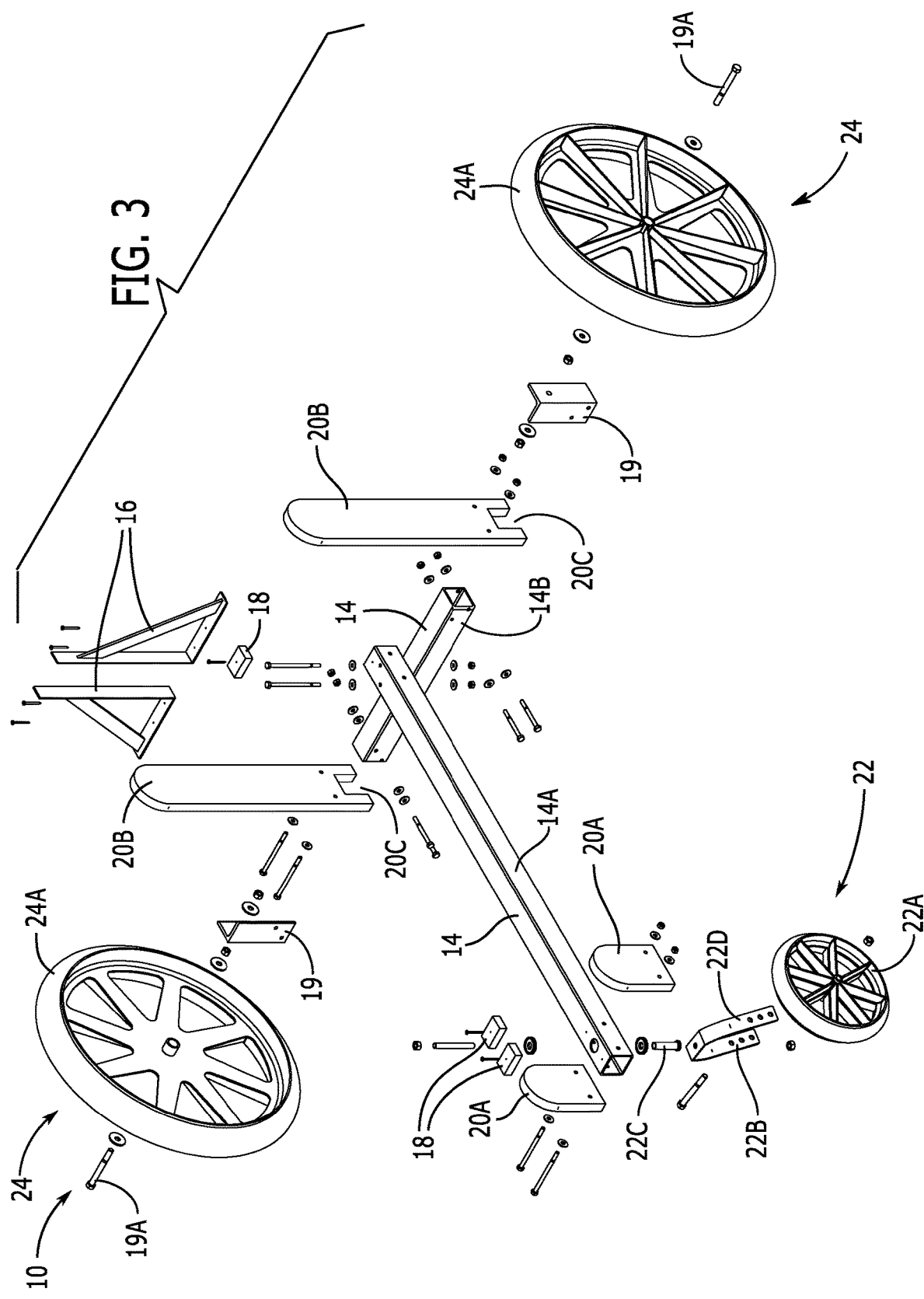
FIG. 3 is an exploded perspective view of the cart.

According to various embodiments as depicted in FIGS. 1-7, disclosed is a cart 10 configured for wheeling a door 11 or other planar object over various terrain. In certain embodiments, cart 10 (also referred to as "door cart 10") may generally comprise a base support frame 14 and side support members 20, which together form a retaining frame assembly 10A configured to support door 11 within cart 10. In certain embodiments, door cart 10 further comprises a front wheel assembly 22 and a rear wheel assembly 24 coupled to retaining frame assembly 10A for rollably supporting retaining frame assembly 10A. In further embodiments, door cart 10 may also include a cord 12 which may be coupled to retaining frame assembly 10A.

In embodiments, base support frame 14 of retaining frame assembly 10A may comprise a longitudinal bar 14A and a transverse bar 14B, wherein transverse bar 14B may be coupled to longitudinal bar 14A proximate a rear end (i.e., at a rear section) of longitudinal bar 14A and in cross alignment thereto. In certain embodiments, transverse bar 14B may be slightly offset from the rear end of longitudinal bar 14A as shown in the figures. In further embodiments, transverse bar 14B may be coupled to a bottom side of longitudinal bar 14A, such that longitudinal bar provides a substantially leveled bottom support surface for door 11 or other item being transported on cart 10, while transverse bar 14B may support rear wheel assembly 24.

In some embodiments, longitudinal bar 14A and transverse bar 14B are elongated aluminum tubes but are not limited to this option. According to an exemplary embodiment, longitudinal bar 14A and transverse bar 14B may have a square cross area that is approximately 2 inches by approximately 2 inches, with wall thickness of approximately ⅛ of an inch. Longitudinal bar 14A may be approximately 42 inches long, while transverse bar 14B may be approximately 16 inches long. It shall be appreciated however, that bars 14A and 14B may be made of various materials and may be of various sizes, dimensions, and geometric configurations in alternate embodiments.

In some embodiments, side support members 20 may comprise front vertical supports 20A and rear vertical supports 20B. In certain embodiments, front vertical supports 20A and rear vertical supports 20B may each comprise two planar brackets configured to retain door 11 from the sides. In some embodiments, front vertical supports 20A may comprise a pair of brackets coupled on right and left sides (i.e. opposing outer sides) of longitudinal bar 14A proximate a front end of the bar.

In certain embodiments, rear vertical supports 20B may comprise a pair of brackets coupled on right and left sides of longitudinal bar 14A proximate a rear end of the bar. In some embodiments, vertical supports 20B may situate over transverse bar 14B and may include bottom openings 20C configured to frame over the top and sides of bar 14B as shown. In some further embodiments, a pair of triangular brackets 16 may be attached to a top side of transverse bar 14B on outer sides of vertical supports 20B (i.e., between vertical supports 20B and rear wheels 24), and are configured to brace supports 20B. In certain embodiments, rear vertical supports 20B may be higher than front vertical supports 20A. According to an exemplary embodiment, both front vertical supports 20A and rear vertical supports 20B may be made from a plastic material, and may be about ¾ of an inch in thickness, with a general width of about 4 inches. Additionally, front vertical supports may be about 6 inches long, while rear vertical supports may be about 20 inches long. It shall be appreciated however, that front vertical supports 20A and rear vertical supports 20B may be made of various materials and may be of various sizes, dimensions, and geometric configurations in alternate embodiments.

Figure 4:
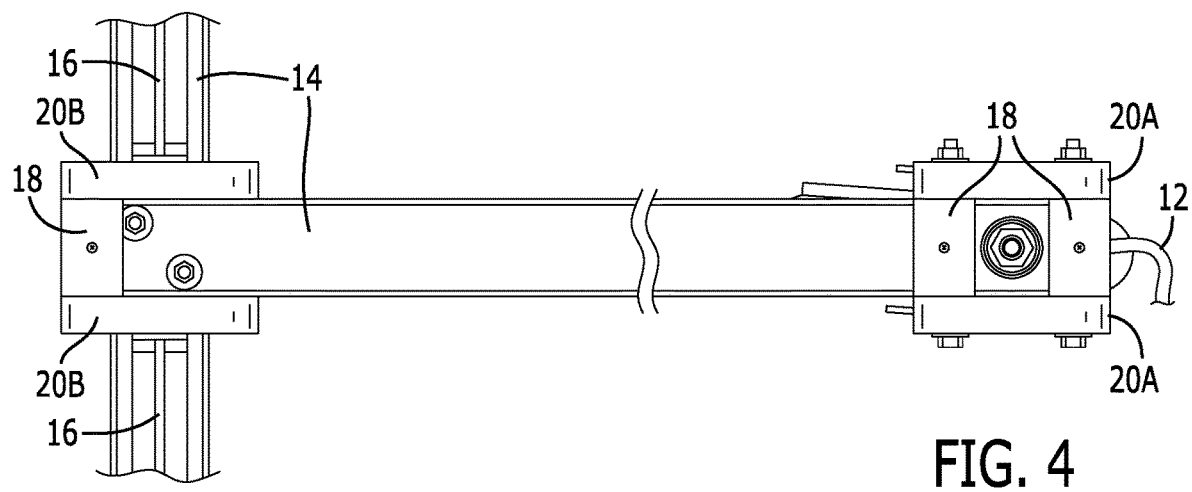
FIG. 4 is a top plan view of the cart.
Figure 5:
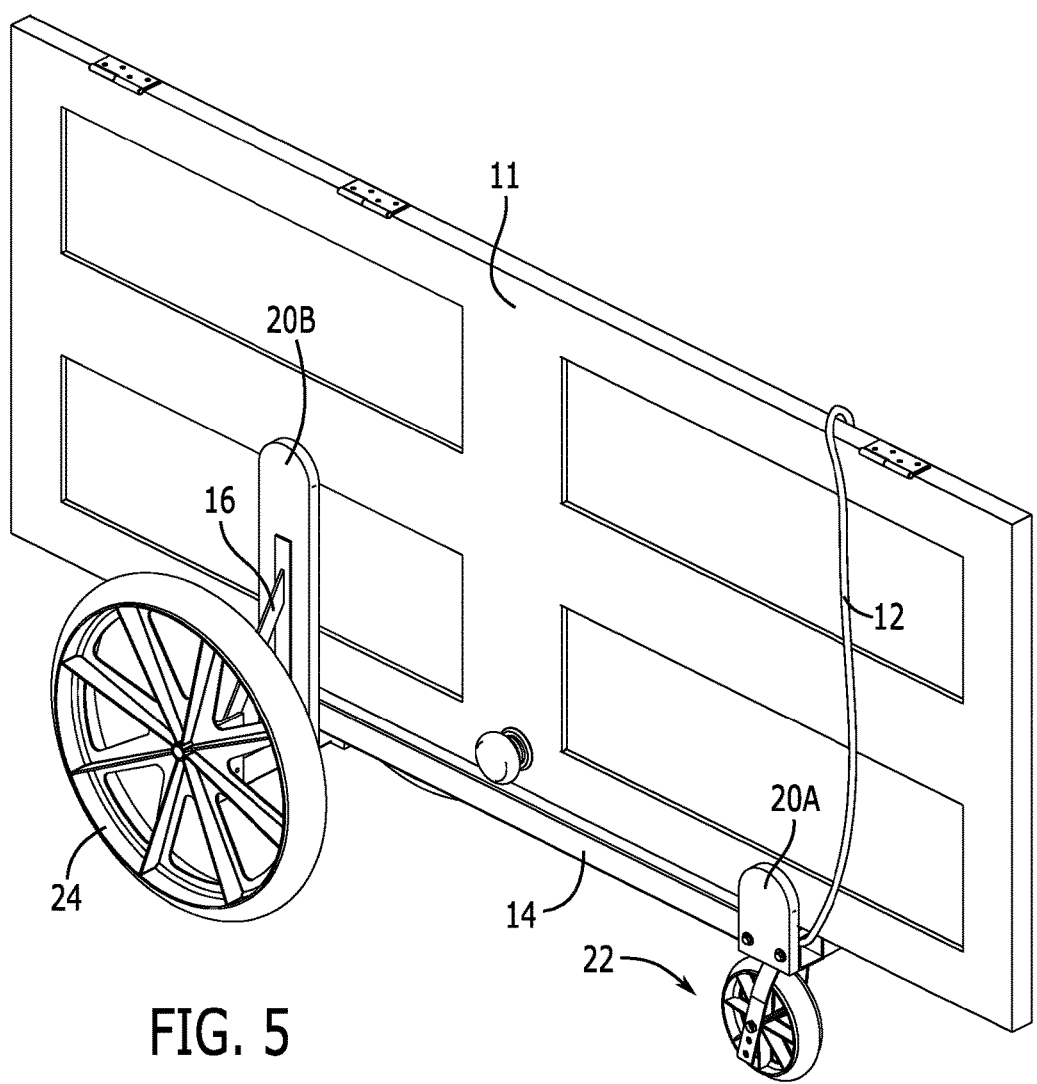
FIG. 5 is a side perspective view, similar to FIG. 1, showing the cart in use for transporting a door.
Figure 6:
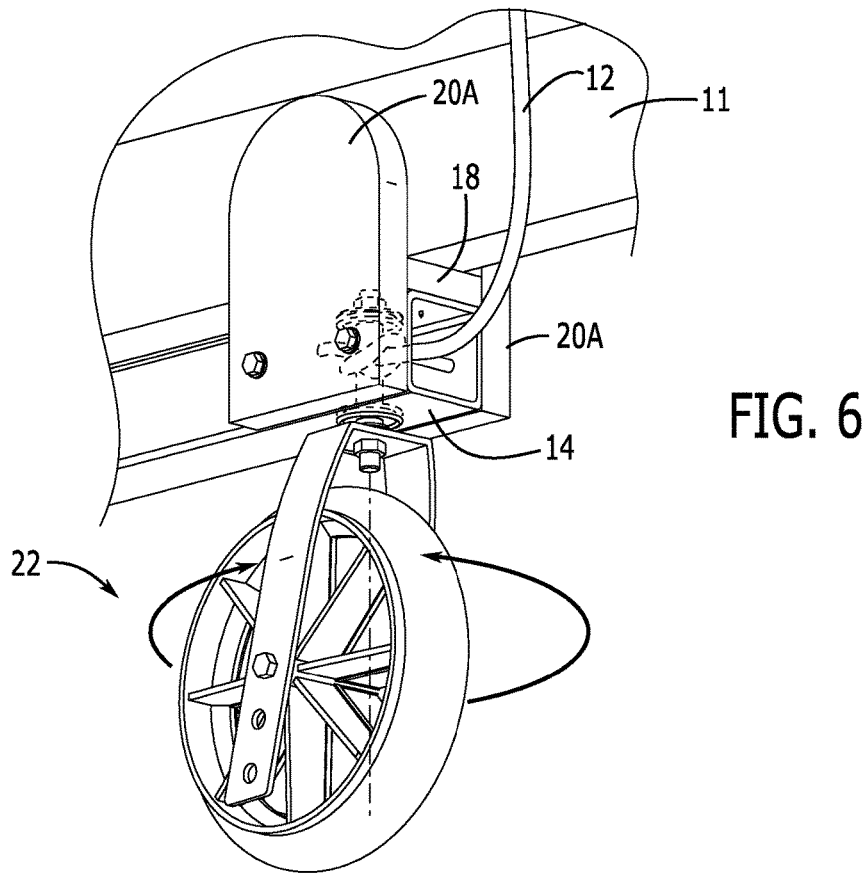
FIG. 6 is a bottom detail perspective view of a front wheel assembly of the cart.

In certain embodiments, cushion blocks 18 may be provided on various sections of longitudinal bar 14A for cushioning door 11 or other item placed atop longitudinal bar 14A. In one embodiment, one cushion block 18 may be placed proximate the rear end of longitudinal bar 14A (i.e., between rear vertical supports 20B) and two cushion blocks 18 may be placed proximate the front end of longitudinal bar 14A (i.e., between front vertical supports 20A), as shown in FIG. 4. Each block 18 may be made from a rubber material and may be about ⅝ of an inch in thickness, about 2 inches in width, and about 1¼ inches in length. It shall be appreciated that various cushioning materials, which may be of different sizes, dimensions, and/or geometric configurations may be used in alternate embodiments, and that cushion blocks 18 may be omitted in alternate embodiments.

In certain embodiments, door cart 10 may comprise 3 wheels in total, wherein front wheel assembly 22 may comprise a single swivel caster wheel 22A ("front wheel 22A") positioned directly beneath longitudinal bar 14A, and rear wheel assembly 24 may comprise two large rear wheels 24A positioned to the sides of longitudinal bar 14A. This wheel configuration enables cart 10 to maneuver easily around corners, up or down inclines, and/or over rough terrain, including debris, gravel, ruts, cords, etc. In one embodiment, the outer diameter ratio between front wheel 22A and rear wheels 24A may be between about 0.3 to about 0.4 but is not limited to this option. According to an exemplary embodiment, front wheel 22A may have an outer diameter of approximately 7 inches, while rear wheels 24A may each have an outer diameter of about 18 inches.

In certain embodiments, front wheel 22A may be attached to a bottom side of longitudinal bar 14A via a swivel wheel bracket 22B. Swivel wheel bracket 22B may be attached to a bottom side of longitudinal bar 14A via a swivel attachment pin assembly 22C engaged through a bottom hole within longitudinal bar 14A. Front wheel 22A may be rotationally coupled to swivel wheel bracket 22B via an axial bolt 22D engaged through a corresponding pair of holes 22D at a bottom section of swivel wheel bracket 22B. In embodiments, several hole pairs 22D may be provided along the bottom section of swivel wheel bracket 22B to enable height adjustment of wheel 22A. As such, front wheel 22A is positioned underneath longitudinal bar 14A and is configured to swivel for allowing easy maneuverability of cart 10. In some embodiments, back wheels 24A may be coupled to transverse bar 14B via a pair of L-brackets 19. In embodiments, each L-bracket 19 may be attached to a side end of transverse bar 14B, wherein wheel 24A may be rotationally coupled to an outer side of the L-bracket via an axial pin assembly 19A.

Figure 7:
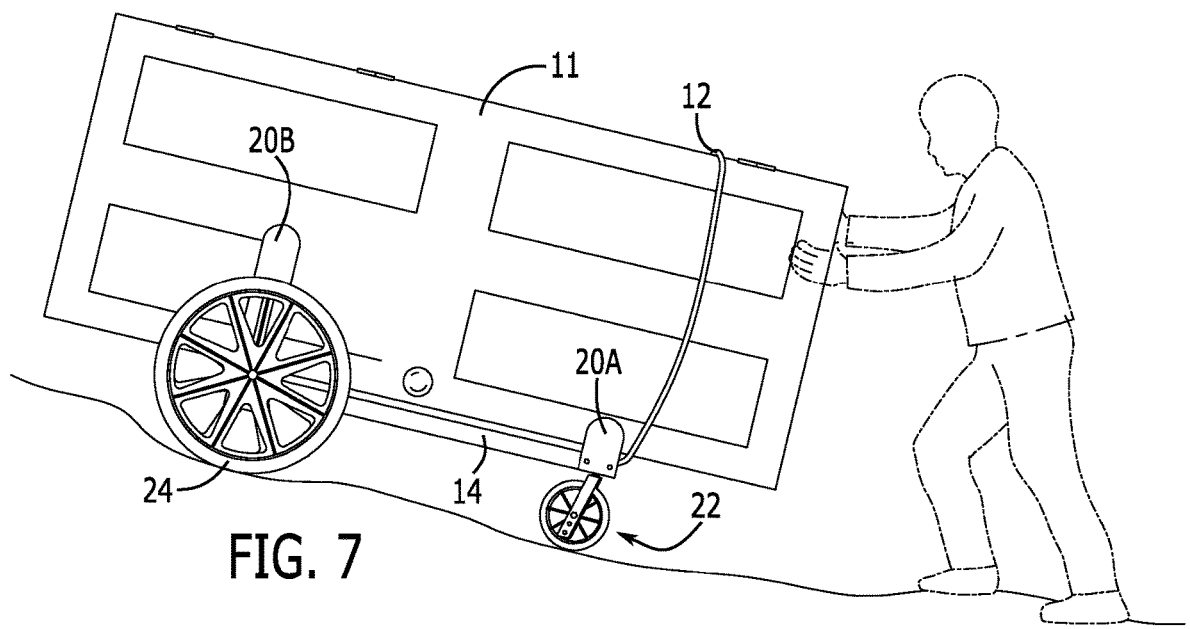
FIG. 7 is a side elevation view of the cart in use.

In certain embodiments, cord 12 may be configured to enable a user to pull cart 10 and/or wrap around door 11 placed atop the cart (see FIG. 7). In one embodiment, cord 12 may be attached at a front end of longitudinal bar 14A. In certain embodiments, cord 12 may be coupled to the swivel pin in swivel attachment pin assembly 22C, which centers cord 12 with respect to longitudinal bar 14A, cart 10, for providing a centered pull force line. In some further embodiments, cord 12 may be looped, enabling it to easily be wrapped around door 11 and/or be pulled by a user. It shall be appreciated that one or more pull cords 12 may be coupled to other parts of cart 10 in alternate embodiments, and that pull cord 12 may be omitted in some alternate embodiments.

It shall be appreciated that the components of cart 10 may be assembled using any known techniques in the field. In one embodiment, components of cart 10 including longitudinal bar 14A, transverse bar 14B, front vertical supports 20A, rear vertical supports 20B, triangular brackets 16, cushion blocks 18, components of wheel assemblies 22, 24, may be attached via an assembly of nuts, washers, and bolts engaged through corresponding holes within the components as shown in the figures. It shall be appreciated however, that different attachment mechanism as known in the art may be used in alternate embodiments.

In use, door 11 or other object may be placed atop longitudinal bar 14A, between vertical supports 20A. In case of transport of a door with hinges, the door may lay sideways on the cart with the hinge side positioned upwards. The cart may then be transported over most terrains to deliver the door to its designated location. The front of the cart may then be tipped up to allow the door to slide out of the cart, in an upright position for installation.

As such, the disclosed subject matter provides a cart that enables a user to easily move doors over challenging terrain and obstacles efficiently and safely and to position the door properly for installation. The retaining frame assembly 10A formed by base support frame 14 and side support members 20 is configured to securely support a door in a vertical position rather than a flat planar position for transport. This reduces the door's footprint, making it less awkward to transport, and enables it to easily be positioned for installation. Additionally, as the rear and front ends of the frame assembly are unobstructed, it can support a door or any length, and allows the door to be placed with its major axis in horizontal alignment, for reduced height and greater stability in transport.

It shall be appreciated that cart 10 may be used for transporting doors of various sizes and configurations, and further for transporting other planar objects such as planks, beams, sidings, windows, mirrors, pictures, and the like.

It shall be appreciated that cart 10 can have multiple configurations in different embodiments. It shall be appreciated that the components of cart 10 may comprise any alternative known materials in the field and be of any size and/or dimensions. It shall be appreciated that the components of cart 10 described herein may be manufactured and assembled using any known techniques in the field. Furthermore, the components of cart 10 may be provided to the end user as an assembled and/or integral unit, or as a kit/assembly of parts according to alternate embodiments.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:
1. A cart for transporting a door comprising:
 a retaining frame assembly configured to support and retain said door in a vertical position, the retaining frame assembly comprising a longitudinal bar and side support members coupled to the longitudinal bar;

a wheel assembly configured to rollably support the retaining frame assembly, the wheel assembly comprising a front wheel assembly coupled to a front section of the longitudinal bar, and a rear wheel assembly coupled to a rear section of the longitudinal bar, wherein the front wheel assembly comprises a single swivel wheel coupled to a bottom side of the retaining frame assembly, wherein the rear wheel assembly comprises a pair of wheels coupled to opposing outer sides of the retaining frame assembly, and wherein the wheels of the rear wheel assembly are larger in diameter than the wheel of the front wheel assembly, wherein the side support members comprise front vertical supports and rear vertical supports, wherein the front vertical supports comprise a pair of planar brackets coupled to opposing sides of the longitudinal bar proximate the front wheel assembly, wherein the rear vertical supports comprise a pair of planar brackets coupled to opposing sides of the longitudinal bar proximate the rear wheel assembly, wherein the retaining frame assembly is configured to support said door, such that the door is positioned atop the longitudinal bar with the door's major vertical axis in alignment with the longitudinal bar and wherein the door is bracketed between the pair of planar brackets of the front vertical supports and the pair of planar brackets of the rear vertical supports, and wherein the retaining frame assembly is unobstructed at its rear and front ends.

2. The cart of claim 1, wherein a diameter ratio of the wheel of the front wheel assembly to the wheels of the rear wheel assembly is between about 0.3 to about 0.4.

3. The cart of claim 1, further comprising a pull cord coupled to the front section of the retaining frame assembly.

4. The cart of claim 1, further comprising a transverse bar which is shorter than the longitudinal bar, the transverse bar being coupled to a rear section of the longitudinal bar at a bottom side of the longitudinal bar, and in cross alignment to the longitudinal bar.

5. The cart of claim 4, wherein the rear wheel assembly is coupled to opposing outer ends of the transverse bar, and wherein the front wheel assembly is coupled to a front section of the longitudinal bar and at the bottom side of the longitudinal bar.

6. The cart of claim 4, wherein the pair of planar brackets of the rear vertical supports are vertically higher than the pair of planar brackets of the font vertical supports.

7. The cart of claim 4, further comprising a first cushioned block attached to a top side of the longitudinal bar at the front section of the longitudinal bar, and a second cushioned block attached to the top side of the longitudinal bar at the rear section of the longitudinal bar.

8. The cart of claim 4, wherein the longitudinal bar and the transverse bar each comprise tubular bars having a square or rectangular cross section.

9. The cart of claim 5, further comprising a pair of triangular brackets attached to a top side of transverse bar and configured to brace the pair of planar brackets of the rear vertical supports.

10. The cart of claim 1, further comprising:
a transverse bar coupled to a rear section of the longitudinal bar in cross alignment to the longitudinal bar, the pair of wheels in the rear wheel assembly being coupled to opposing outer ends of the transverse bar; and
a pair of triangular brackets attached to a top side of transverse bar, wherein each triangular bracket in the pair of triangular brackets is disposed between a respective one of the pair of planar brackets of the rear vertical supports and a corresponding wheel of the rear wheel assembly,
wherein the pair of triangular brackets are configured to brace the pair of planar brackets of the rear vertical supports.

11. The cart of claim 1, wherein the swivel wheel of the front wheel assembly is coupled to the bottom side of the longitudinal bar via a swivel wheel bracket, the swivel wheel bracket being attached to a bottom side of the longitudinal bar via a swivel attachment pin engaged through a bottom hole in the longitudinal bar and the swivel wheel is coupled to the swivel wheel bracket via an axial bolt engaged through a corresponding pair of holes in the swivel wheel bracket.

12. The cart of claim 1, further comprising a pull cord coupled to the swivel wheel attachment pin, wherein the pull cord is centered with respect to the longitudinal bar for providing a centered pull force line on the cart, and wherein the cord is configured to wrap around said door when said door is supported on the retaining frame assembly.

* * * * *